Aug. 19, 1924.   1,505,922
G. H. HARRIS
GAS COCK
Filed April 14, 1921
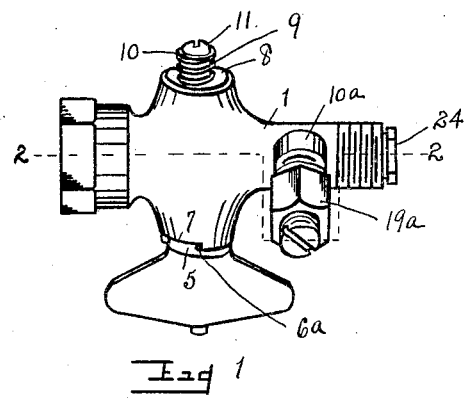
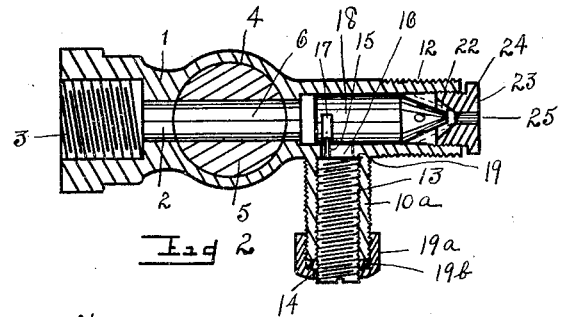
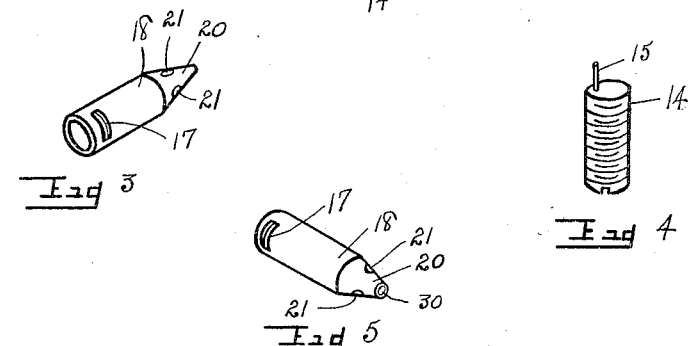
INVENTOR
George H. Harris
BY
Thomas L. Wilder
ATTORNEY Patented Aug. 19, 1924.

1,505,922

UNITED STATES PATENT OFFICE.

GEORGE H. HARRIS, OF UTICA, NEW YORK, ASSIGNOR TO UTICA VALVE & FIXTURE COMPANY, OF UTICA, NEW YORK, A CORPORATION OF NEW YORK.

GAS COCK.

Application filed April 14, 1921. Serial No. 461,326.

*To all whom it may concern:*

Be it known that I, GEORGE H. HARRIS, a citizen of the United States, residing at Utica, in the county of Oneida and State of New York, have invented certain new and useful Improvements in Gas Cocks, of which the following is a specification, reference being had therein to the accompanying drawing.

My invention relates to a gas cock and I declare the following to be a full, clear, concise, complete, and exact description thereof sufficient to enable anyone skilled in the art to which it appertains to make and use the same, reference being had to the accompanying drawings, in which like parts are represented by like characters throughout the specification.

The object of the invention is to provide an adjustable valve cock adapted for use more particularly on gas water heaters. Such a cock will be found servicable in view of the fact that the pressure of gas differs considerably in different locations where the gas is generated, whereas water heaters require a more or less uniform volume and pressure of gas. The cock is constructed in such manner that it can be adjusted after it has been assembled in a permanent position and without removing said cock.

The object will be understood by referring to the drawings, in which:

Fig. 1 is a perspective view of the gas cock;

Fig. 2 is a transverse central section of the gas cock, taken on the line 2—2 of Fig. 1;

Fig. 3 is a detail perspective view of a thimble employed;

Fig. 4 is a detail perspective view of a cam screw employed;

Fig. 5 is a detail perspective view of a modified form of thimble employed.

Referring more particularly to the drawings, the valve or gas cock casing is represented by —1—. It has a central passageway 2 therethrough for the conduction of gas. Said passageway 2 is enlarged at 3 and threaded for connection with a supply pipe. Furthermore, the passageway 2 opens into the transverse tapered socket 4 formed in the casing —1— and in which socket is disposed a tapered turn key 5. The key 5 has an aperture 6 therethrough adapted to aline with the passageway 2, when said key 5 is turned at the proper angle into open position. A pin $6^a$ is mounted to project from the key 5 and is adapted to abut against the shoulders at either end of the recess 7 formed in the lower edge of the casing —1— about the tapered socket 4, whereby to limit the turning of the key 5 in either open or closed position. The key 5 is held in assembled place, whereby it can turn therein by a washer 8, a coiled spring 9 disposed about the reduced upper end of the key 5, whereby to hold the key yieldingly in mounted position, a second washer 10 and a headed screw bolt 11 turned into a threaded orifice formed in the reduced part of the key 5. The casing —1— is equipped with external threads at 12 for joining that end to a Bunsen burner, not shown, or other fitting.

The novel features embody a tube $10^a$ formed at right angles to the casing —1— and threaded internally at 13 for the screw mounting of a cam screw 14 that carries an upstanding cam pin 15. The cam pin 15 projects through an enlarged recess 16 made in the wall of the casing —1— and adapted to engage an elongated annular cam recess 17 formed in the side of the hollow cylindrical shaped thimble 18. The recess 16 is so formed as to provide for an annular shoulder at 19, whereby to limit the inward turning movement of the cylindrical screw 14 to prevent said screw 14 from binding against the surface of the thimble 18. The outward movement of the screw 14 is limited, likewise, by the spud or hood 23, which when properly assembled within the passageway 2 prevents the cam screw 14 bearing the cam pin 15 from making a complete revolution because of the projection of cam pin 15 in recess 17 of thimble 18 and the limitation of the outward movement of said thimble. This, therefore, will prevent the withdrawal of the cam pin 15 from recess 17 of thimble 18, which might happen in the case of an inexperienced operator, if such a limitation was not provided for. A gland nut $19^a$ having a shoulder is screw mounted to the external threads of the tube 10, whereby to hold packing $19^b$ and prevent any leakage of gas at this location.

The outer end of the hollow cylindrical shaped thimble 18 is conical and forms a nozzle 20 that is provided with apertures 21 arranged in a circle about the nozzle 20. The nozzle 20 is adapted to co-operate with the conical shaped chamber 22 formed on the inner surface of said spud or hood 23 which has a headed nut 24. However, the pitch of the conical chamber 22 is greater than that of the nozzle 20, whereby said nozzle 20 will meet the contiguous surface of the chamber 22 to provide a complete shut off, when desired.

The nozzle 20 having apertures 21 permits the flow of gas therethrough and also through an aperture 25 formed in the center part of the hood 23. The aperture 25 of the hood 23 is sufficiently large to permit the maximum volume of gas therethrough that comes from the aggregate openings of apertures 21 of the nozzle 20, when the parts are in open position. However, the volume of gas passing through the aperture 25 can be governed by moving the thimble 18 more or less near to the hood 23. No matter what relation or degree of nearness the nozzle 20 has to hood 23, said parts will provide for continuously maintaining an annular orifice for the passage of gas, which annular orifice is most desirable for maintaining a direct flow with best results and preventing a deflected flow with poor results.

The movement of thimble 18, whereby to adjust its position with reference to hood 23 to govern the volume and pressure of gas will be accomplished by turning the cam screw 14 and, thereby, the cam pin 15 which plays in recess 17 of thimble 18, whereby to actuate the thimble 18 relative to hood 23. When the thimble 18 is moved up to the dotted line position illustrated in Fig. 2, where the side walls of the chamber 22 make contact with the periphery of the nozzle 20, there is a resultant complete shut off of the flow of gas. When, however, the thimble 18 is moved into the full line position illustrated in Fig. 2, the gas will have free passageway through the several apertures 21. Obviously, variations in pressure and volume of flow of gas will be effected by moving the thimble 18 by means of the cam screw 14 to any location between the two extremes above mentioned.

The plurality of apertures 21 in the nozzle 20 of thimble 18 will aid in causing the gas to flow in its normal swirling condition with the same volume and pressure after it has passed through said thimble 20 as before. Such a result will be desirable in any locality where maximum volume and pressure is needed.

It will be noted that the cam screw 14 permits of the adjustment of the thimble 18 with reference to the hood 23, whereby to govern the volume and pressure of the flow of gas through the cock, even after the cock has been permanently assembled to a Bunsen burner, not here shown, or other fitting, without detaching the cock to substitute new parts, as has been the practice heretofore.

Thimble 18 may be constructed with a central aperture through its apex, as at 30 to add an ejector action for the low medium pressure gases. In such construction, there will be always a minimum flow of gas through the cock determined by the size of aperture 30.

Having thus described my invention what I claim as new and desire to secure by Letters Patent is:

1. In a gas cock, a thimble having a conical shaped end located within said cock, apertures made in the thimble, whereby to cause the gas to flow therethrough in its normal swirling condition, an annular recess formed in the side of the thimble, a cam pin adapted to project through said recess, a screw for mounting said pin, a chamber having a conical shaped wall adapted to co-operate with the conical shaped end of the thimble, whereby to control the passage of the gas, said wall adapted to limit the movement of the thimble, and a shoulder formed in the casing, whereby to limit the movement of said screw.

2. In a gas cock, a thimble having a conical shaped end located within said cock, apertures made in the thimble, whereby to cause the gas to flow therethrough in a normal swirling condition, an elongated recess formed in the side of the thimble, a cam pin adapted to project through said recess, a screw for mounting said pin, a screw threaded tube for mounting said screw, a hood screw mounted to said gas cock, a chamber having a conical shaped wall formed within said hood and adapted to co-operate with the conical shaped end of the thimble, whereby to control the passage of gas, means for limiting the movement of said screw, and means for permitting a minimum flow of gas through the cock at all times.

In testimony whereof I have affixed my signature.

GEORGE H. HARRIS.